(12) United States Patent
Frojmovics

(10) Patent No.: US 9,179,665 B2
(45) Date of Patent: Nov. 10, 2015

(54) METHOD AND SYSTEM FOR MONITORING AND COMMUNICATING THE STATUS OF TRAPS FOR VERMIN OR PESTS

(75) Inventor: Abraham Frojmovics, Brussels (BE)

(73) Assignee: TRANSPORT DATA PUBLICATIONS SPRL, Brussels (BE)

( * ) Notice: Subject to any disclaimer, the term of this patent is extended or adjusted under 35 U.S.C. 154(b) by 98 days.

(21) Appl. No.: 14/009,857

(22) PCT Filed: Apr. 3, 2012

(86) PCT No.: PCT/EP2012/056053
§ 371 (c)(1),
(2), (4) Date: Oct. 4, 2013

(87) PCT Pub. No.: WO2012/136647
PCT Pub. Date: Oct. 11, 2012

(65) Prior Publication Data
US 2014/0018051 A1 Jan. 16, 2014

(30) Foreign Application Priority Data

Apr. 5, 2011 (BE) .................................. 2011/0201

(51) Int. Cl.
*G08B 23/00* (2006.01)
*A01M 23/00* (2006.01)
*A01M 23/08* (2006.01)
*A01M 31/00* (2006.01)
*H04W 4/16* (2009.01)

(52) U.S. Cl.
CPC .............. *A01M 23/00* (2013.01); *A01M 23/08* (2013.01); *A01M 31/002* (2013.01); *H04W 4/16* (2013.01)

(58) Field of Classification Search
CPC ...... A01M 1/026; A01M 23/00; A01M 23/08
USPC ................ 340/573.2, 562; 43/58, 61, 65, 82; 705/317
See application file for complete search history.

(56) References Cited

U.S. PATENT DOCUMENTS

| 6,937,156 | B2 * | 8/2005 | Gardner et al. | ............ 340/573.2 |
| 7,020,996 | B2 * | 4/2006 | Beroza et al. | ................... 43/124 |
| 7,656,300 | B2 * | 2/2010 | Ronnau | ....................... 340/573.2 |
| 2005/0151653 | A1 * | 7/2005 | Chan et al. | ................. 340/573.2 |
| 2008/0204253 | A1 * | 8/2008 | Cottee et al. | ............... 340/573.2 |
| 2013/0174469 | A1 * | 7/2013 | Kittelson | ......................... 43/61 |

FOREIGN PATENT DOCUMENTS

| DE | 20 2004 013928 | 1/2006 |
| WO | 2008/035304 | 3/2008 |

OTHER PUBLICATIONS

International Search Report dated Jul. 3, 2012; corresponding to PCT/EP2012/056053.

* cited by examiner

*Primary Examiner* — Toan N Pham
(74) *Attorney, Agent, or Firm* — Young & Thompson

(57) ABSTRACT

A method and a device or system for monitoring and communicating the status of traps for vermin or pests, the method includes a step of triggering of the alarm, for example by a proximity detector, a step of registering this alarm, a step of transmission by wireless communication, for example via a modem, to a server in the form of an unanswered call, a step of interpretation by the server by comparing the calling number and called number in order to determine the nature and origin of the alarm, and also the transmission thereof to a user.

20 Claims, 2 Drawing Sheets

METHOD AND SYSTEM FOR MONITORING AND COMMUNICATING THE STATUS OF TRAPS FOR VERMIN OR PESTS

FIELD OF THE INVENTION

The invention relates to a device or a system, and a method for the monitoring and communicating of traps for vermin or pests, such as rodents.

It is necessary to regularly inspect the state of bait placed at different locations inside or outside a building so as to check whether pests or vermin have touched it and to replace it, if necessary. The state of the inspection as well as the communication of the results is to be ensured so as to be able to take the necessary measures, such as the resupplying of the bait as well as the removal and the elimination of the vermin or pest.

STATE OF THE ART

For these purposes, in the state of the art, the use of telecommunications modules that are installed on the traps is known. The various boxes communicate by means of one or more centralized telecommunications devices that are located fairly close to the bait with a computer server, which relays the relevant information to the users. The communication to the server is carried out by means of fixed telephone lines or by GSM.

The methods of the state of the art present disadvantages.

A first disadvantage is the necessity for installing a telecommunications network, so as to ensure that all of the bait can communicate data to a telecommunications mode that transmits the data from all of the bait in question to the server.

This communications network requires an energy source that is not always available in the locations where these traps are deployed.

In addition, the communications network sometimes requires connecting to the Internet, which is not always available.

A second problem is the networking of various traps deployed at the site, for example the building to be monitored. The interconnectivity of the traps is to be done either by means of cable or by means of a wireless communication system. In the first case, the wires can interfere with the activity carried out at the site or the building to be monitored. In the second case, the traps should be located less than a maximum distance, otherwise communication is not possible.

A third problem is the absence of GPRS interconnection connections (mobile Internet) between certain operators, which considerably reduces the quality of communications, in the case of the absence of a partner network.

Certain traps are equipped with a one-way entry system, for example via swing trays, but this system is not used to signal the passage of a vermin or pest.

Finally, the electronic sensors for vermin or pests are often in direct contact with the latter; this can cause them to deteriorate.

SUMMARY OF THE INVENTION

One object of the invention is to propose a method so as to monitor whether a vermin or pest or any other animal enters a trap and to inform the user of this event in real time.

For this purpose, the method, the system or the device according to the invention is characterized in that the trap is equipped with an autonomous mobile telephony telecommunications module as well as a printed circuit board, comprising, among others, a memory and a processor, with the method comprising: a step of detection where the vermin or pest enters the trap, a step of communication of this state to a server, by means of an unanswered call to a server; a step of decoding the message that includes the call number of the communication module as well as the telephone number of the party called, connected to the server; and a step of triggering an alarm event by which an object or an individual is contacted by telecommunications, so as to signal the capture of the vermin or pest.

The method according to the invention makes possible the use of a free telephone communication means, thanks to the recourse to the "unanswered call." Actually, from the called box, i.e., the modem that is connected to the server, or a virtual telephone number, the communication is rejected by the server after the latter has recorded the call number.

The mobile telephony communication can be carried out throughout the entire world, since the operators that are used have access connections with the mobile telephony networks in virtually all of the countries of the world.

The method according to the invention offers an important autonomy to the energy level by the use of long-life batteries of, for example, lithium type, or rechargeable batteries, or super condensers that are rechargeable by mechanical means.

The invention also relates to a system for processing data. This processing consists in making a connection between the mobile telephone number of the trap that is calling with the mobile telephone that is connected to the server. The server interprets the conjunction of these two mobile telephone numbers so as to be able to provide an interpretation of the latter. These numbers can be supported by cards called SIM cards having an identification that is unique, unambiguous, and valid on the world scale. Each pair of numbers received by the server is interpreted and indicates a change in the status of the trap.

The server is equipped with one or more different mobile telephone numbers or virtual numbers, so as to allow the reception and the interpretation of pairs of different numbers, at the beginning of at least one trap equipped with the system comprising a mobile telephony modem, a printed circuit board, a processor, as well as a memory medium.

The invention also relates to a system for monitoring a trap against the vermin or pests and wild animals, comprising at least one trap that may or may not comprise at least one bait and that comprises a system for monitoring the absence or the presence of at least one vermin or pest or another animal, comprising a management module that is a printed circuit board whose function is the management of alarms, the transfer of alarms to an electronic module, comprising a modem for the mobile telephony, means for recording an alarm, and transmission management means capable of alerting a server.

Regarding the server, the invention also relates to a system for interpretation of the contents of transmissions coming from the bait.

According to one embodiment, the invention also relates to a system for detecting the capture of a vermin or pest animal, such as a mouse, rat, field mouse or any other vermin or pest, when the vermin or pest enters the trap.

The invention can also be applied to a system for detecting the capture of an animal that may or may not be wild, such as a fox, weasel, raccoon dog, stone marten, cottontail rabbit, marten, polecat, beaver, muskrat, raccoon, wild boar, American mink, or any other wild animal, when the wild animal enters the independent trap.

The invention also relates to the software that interprets and manages the recorded signals, such as the capture of a vermin or pest, an indication of a minimal battery charge, and any other recorded parameter, and transmits the latter to the modem for its retransmission to the server.

According to one embodiment, the recording of the intrusion of the vermin or pest is provided by the passage of a magnet that is affixed to the system for capturing the vermin or pest, in front of a proximity detector.

The invention also relates to the method of engaging the device, for example by the removal of a magnet on the outside part of the electronic box of the device, behind which an electromagnetic switch, such as, for example, of the REED type, is located.

BRIEF DESCRIPTION OF THE FIGURES

These aspects as well as other aspects of the invention will be clarified in the following description of particular embodiments of the invention, reference being made to the accompanying diagrammatic figures in which.

DETAILED DESCRIPTION OF PARTICULAR EMBODIMENTS

Figure 1:
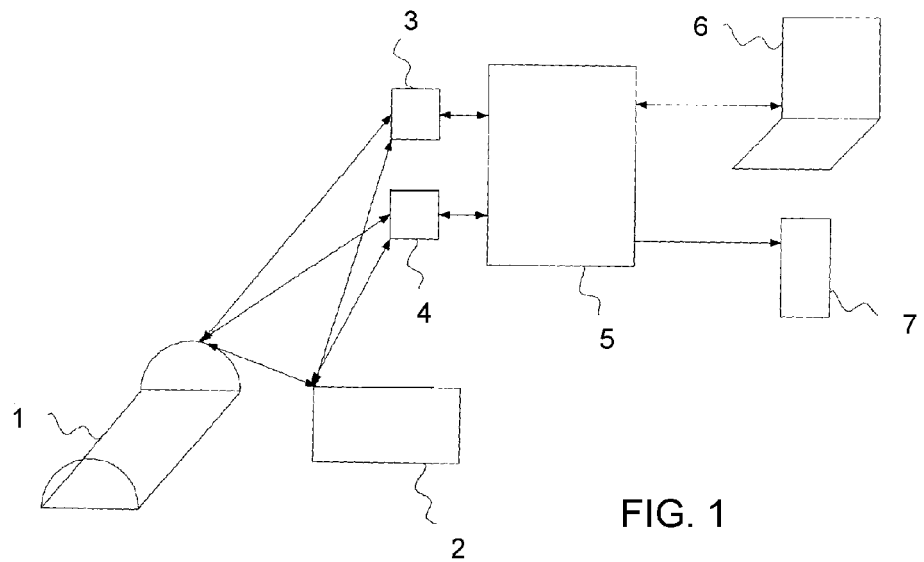
FIG. 1 shows a general diagram illustrating a device according to the invention, FIG. 2 very diagrammatically shows a trap placed in a corner of a room illustrating all of the elements, such as the swing tray 23, the arm 24, as well as the magnet 25. The latter engages the switch, for example, of the REED type 28, by passing in front of the latter, when the weight of the rodent makes the swing tray swing.

FIG. 1 shows a general diagram in the form of a block diagram of a particular embodiment of the system according to the invention. This diagram illustrates the primary elements of the invention: the trap 1, the cassette 2 comprising the PCB (printed circuit), the modem, the antenna, the SIM card, the battery as well as the switch, the modem(s) 3 of the sever, and the virtual number(s) 4 are distinguished. Also, a server 5, a PC 6 with optional display, and a mobile telephone 7 are illustrated.

Figure 2:
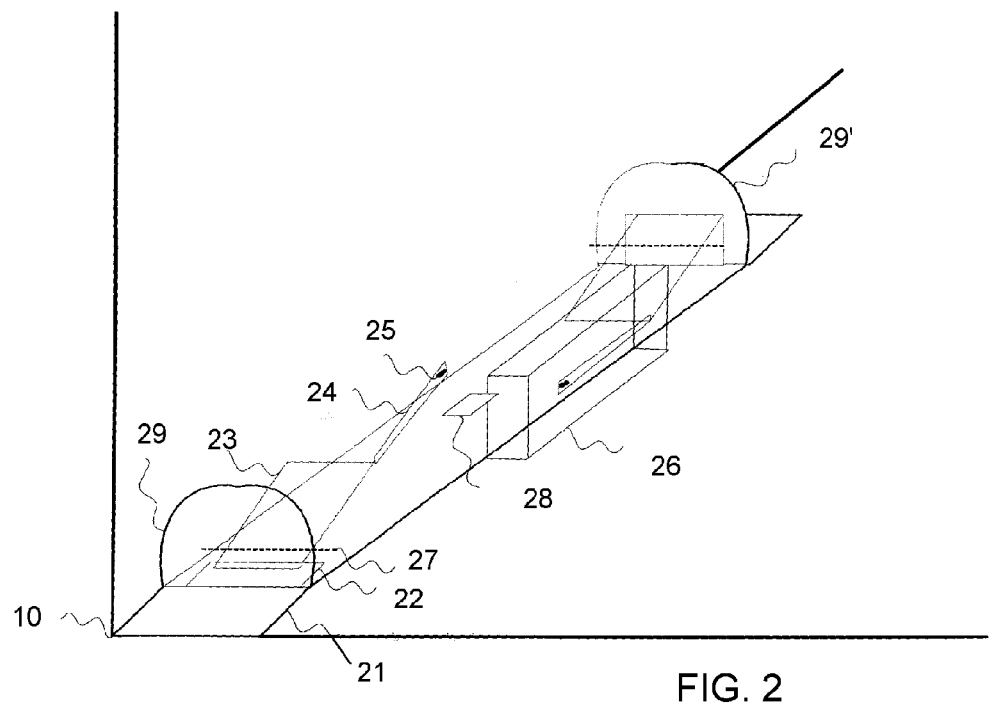

With reference to FIG. 2, a trap 21 that is equipped with at least two tunnels with openings 29, 29' containing swing trays 23 that pivot vertically on both sides of an axis 27 is illustrated. The entry to each tunnel is equipped with a platform 21 that makes it possible for the trap to be placed against a corner 10 of a room while offering the possibility to the vermin or pest to easily enter the entry tunnels 29.

The platform ensures accessibility to the trap to the vermin or pest, in the case where the latter would be inadvertently moved against a corner of the room, thus blocking access to at least one access to the entry tunnel.

By default, the swing tray is in a lower position, beside the entry, making possible the access of the vermin or pest to the trap.

Each swing tray is equipped with an arm 24 that is itself provided with a magnet 25. The entry to each tunnel is equipped with a non-return valve 22 that prevents any exit of the vermin or pest when it goes beyond the axis of the inclined plane. The swing tray brings about the closing of the valve when the portion of the swing tray, located beside the entry to the tunnel 29, is in the upper position.

Figure 3:
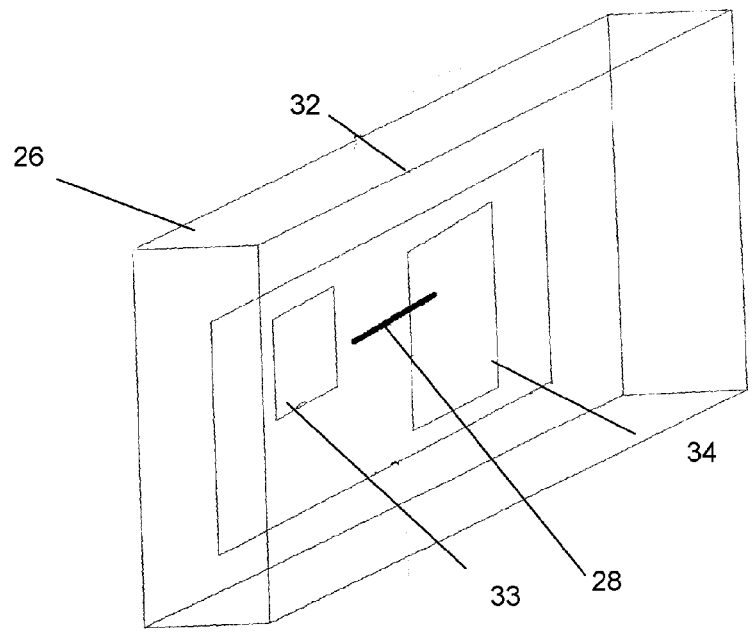
FIG. 3 illustrates the cassette that is part of the trap and that contains all of the electronic components.

By referring to FIG. 3 also, when the vermin or pest enters one or the other tunnel and goes beyond the axis of the swing tray, the arm 24 moves in front of the "Reed"-type magnet detector breaker 28, which is located inside the cassette 26 containing the electronic part and initiates the call to the server. The electronic part is powered by a long-life battery 33. The Reed-type magnet detector 28 is housed inside the cassette containing the electronic part, thus the vermin or pest does not have any way to gnaw on and damage the sensitive components of the system. The cassette remains totally independent of the mechanical part and makes possible a rapid change by a vertical slide system.

The excitation element of the proximity detector, inserted into the arm 25, can also be a magnet, when the proximity detector is a Reed-type magnetic breaker 28.

The excitation element inserted into the arm 25 can also be a heat source when the proximity detector is an infrared-type detector.

The excitation element inserted into the arm 25 can also be the body heat of the vermin or pest, when the proximity detector is an infrared-type detector.

Figure 4:
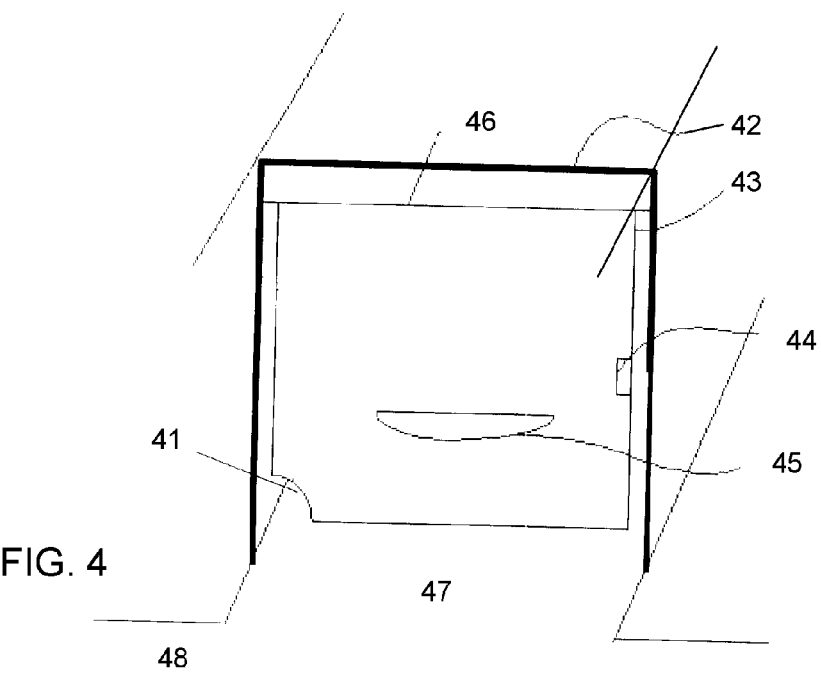
FIG. 4 shows the diagrammatic detail of a particular embodiment that uses the passage beside or through an access door to a trap.

The excitation element can also be inserted into an access door. FIG. 4 illustrates such an implementation.

In this particular embodiment, the access door 43 is suspended in a frame 42 that pivots freely over a horizontal axis 46 that is integral with the upper part of the door.

When the rodent moves into the corridor 47, he runs into or pushes the door in his path toward the bait located behind said door that is preferably made of transparent or translucent material.

The affixed magnet 44 then moves in front of the Reed-type breaker 28. When the rodent wants to exit from the corridor 47, he can follow the hole 41 in the door 43 in the event the door only swings in the direction of the bait.

When the rodent moves into the corridor 48, he pushes—because of his size—the platform 45 that is affixed horizontally on the door 43. This movement triggers a swinging of the door along the horizontal axis 46, which in turn initiates the passage of the magnet 44 in front of the REED-type breaker 28.

The modem that is located inside the cassette containing the electronics is equipped with a printed circuit board 32 whose software manages the various alarm signals and transmits the data to be sent by mobile telephony to the server. The alarm signals can reach the proximity detector but also a sensor indicating the minimal charge state of the battery 33.

The onboard software on the printed circuit board safeguards the reference number of the sensor on the memory medium. Various reference numbers, such as that of the proximity detector, but also the sensor indicating the minimal charge of the lithium cell or any other cell or battery, necessary to make the system operate, can be safeguarded. During an intrusion of a vermin or pest, the onboard software records the alarm signal that comprises a reference number. In the same manner, when the minimal charge of the battery reaches a lower threshold, the onboard software records a reference number.

Each reference number corresponds to a telephone number to be called remotely. All of the telephone numbers to be called are pre-recorded on the SIM card of each modem, located in the trap.

The modem in the trap makes an unanswered call to the ad-hoc modem that contains a SIM card, connected to the server. The modem can also make an unanswered call to a virtual telephone number connected to the server.

When a call is received by one of the modems or one of the virtual telephone numbers, which are connected to the server, a computer application on the server records the call number, which is communicated when the telephone connection is established and interrupts the call. There is no transfer of either voice or data.

The pair, comprising the original number of the call as well as the destination number of the call, the latter being the telephone number of the destination modem, or the destination virtual telephone number, is compared by the software that is resident on the server to a local database.

The database consists of pairs of telephone numbers, being a call number and a destination number. Each pair of numbers thus indicates a trap, by the calling telephone number and an event that is linked to it, indicated by the called telephone number. The local database in the server is built up as traps are added to the system.

An action list is predefined by the user and entered into the server by a computer tool via Internet, such as, for example, a browser. After the reception and the interpretation of a pair of numbers, one or more computer processes are automatically undertaken by the server.

These processes comprise sending certain e-mail message and text messages, predefined by the user, to the computers 6 and/or mobile telephony devices 7 of the users. The Internet software also comprises a graphical user interface, which makes it possible to display on a plane the trap that triggered the alarm, with an indication of the date, the hour, as well as the nature of the alarm.

The Internet software also makes it possible to manage the users, traps, and other devices, such as door-openers, portal-openers, and light breakers.

The actions can also comprise a triggering of an unanswered telephone call to a device that is equipped with a modem as well as a printed circuit board, a processor, and comprising a memory medium. This object can be, for example, a trap for mice, rats, or any other vermin or pest.

Upon receipt of the unanswered call, the processor compares the pair of telephone numbers of the calling device, as well as the modem receiving the call, and compares it to a list of messages, being safeguarded in memory on the printed circuit board. In turn, this message triggers an action such as the closing of the access to the trap, the addition of food, etc.

In one particular embodiment, the cassette that comprises the electronic equipment is independent of the trap. This may be the case of traps for larger animals than vermin or pests, which are too large to be able to enter the vermin or pest trap, as described in FIG. 1.

In this latter case, the triggering of the alarm can be done by means of a cable or a cord of which one end is magnetically connected to the cassette containing the electronic equipment, with the other end being connected to the entry door of the trap. When the animal enters the trap, the opening or the closing of the door of the latter brings about a pulling on the cord. This pulling removes the magnet from the electronic cassette. In this last particular embodiment, the action of removing the magnet from the cassette and consequently from the switch found inside the cassette brings about the triggering of an alarm.

In one particular embodiment, these actions of triggering calls and receiving calls, followed by an interpretation of the pair comprising the calling telephone number and the called telephone number, can be reproduced ad infinitum, i.e., objects, calling other objects or traps and carrying out particular maneuvers.

In one particular embodiment, the server sends an e-mail message via the Internet to inform the user of the alarm in the event a vermin or pest intrudes into a trap.

In one particular embodiment, the server sends a text message to inform the user of the alarm in the event a vermin or pest intrudes into a trap.

In one particular embodiment, the server sends an e-mail message via the Internet to inform the user of a command being sent to a trap.

In one particular embodiment, the server sends a text message to inform the user of a command being sent to a trap.

In one particular embodiment, the server sends an e-mail message via the Internet to inform the user of a command being sent to another device.

In one particular embodiment, the server sends a text message to inform the user that a command has been sent to another device.

The invention thus describes a trap monitoring device comprising several devices equipped with a modem, a processor, a printed circuit board, with a memory medium, which comprises or is connected to one or more sensors or detectors, with the signal of each sensor being interpreted and directed in the form of at least one unanswered call to a server comprising at least one call number, with the software of said server interpreting the origin and the nature of the signal on the basis of the pair(s) of call numbers from the calling number and the called number. Based on this interpretation, the server can then call said devices or other devices, always preferably in the form of an unanswered call, to provide suitable instructions based on defined software.

The invention claimed is:

1. A device for monitoring at least one trap for animals, in particular for vermin or pests and for wild animals in which the trap is equipped with an autonomous mobile telephony telecommunications module or modem associated with a telephone number, as well as a printed circuit board, comprising, among others, a memory and a processor, with the device implementing a method comprising:
    a step of detection when an event or state occurs;
    a step of making a communication of this state to a server (5), by making an unanswered call to this server at a specified call number;
    at the server level, a step of interpreting a contents of the communication, the step of interpreting the contents of the communication including both i) identifying the telephone number of the telecommunications module, and ii) identifying the specified call number connected to the server; and
    a step of triggering an alarm event by which an object or an individual is contacted by the server, so as to signal said state or event detected in said trap.

2. The device according to claim 1, in which the detection step takes place when the vermin or pest enters the trap (1).

3. The device according to claim 1, wherein,
    for each of a set of plural detected events or states, there is associated a different respective specified call number at the server, and
    the step of making the communication of this state to the server (5) is made to the specified call number associated with a currently detected event or state such that the specified call number of the unanswered call to the server depends on said currently detected state or event from among the set of plural detected events or states.

4. The device according to claim 1, further comprising a rechargeable battery in which the detection step occurs when a charge state of the rechargeable battery is below a specified level, and the specified call number is associated with the charge state of the rechargeable battery is below a specified level, and a further specified call number is associated with the vermin or pest entering the trap.

5. The device according to claim 1, in which the step of interpreting the unanswered call is based on the associated telephone number of the calling modem of the trap, and the specified call number of the server, the associated telephone call number of the calling modem of the trap and the specified call number of the server defining a pair of numbers, with pair of numbers indicating both an origin of the call, as well as a nature of the alarm, with the nature of the call being indicated by the specified call number of the server.

6. The device for monitoring a trap against vermin or pests according to claim 1, in which the at least one trap (1) comprises at least one box of a size suited to said vermin or pest and having at least one opening (29, 29') and a non-return valve (22) that prevents any return of the vermin or pest through said at least one opening and comprising an excitation element of a proximity detector (25).

7. The device according to claim 1, comprising a step for recording the alarm following said detection on the memory medium of the printed circuit board.

8. The device according to claim 1, wherein following an interpretation of an unanswered call to the server, the server carries out a certain maneuver, including triggering an alarm event by which an object or an individual is contacted by telecommunications, so as to signal i) capture or intrusion of the vermin or pest in the trap, or ii) another detected event.

9. The device according to claim 8, wherein the server, responsive to the triggered alarm event, contacts one or more individuals by e-mail or text.

10. The device according to claim 1, in which the detection step is carried out using a Reed-type breaker and a magnet, or using a magnetic breaker and a magnet, or using an infrared breaker and a heat source.

11. The device according to claim 1, in which the detection is carried out by an opening of an access door to or in the trap by the vermin or pest, with an excitation element of a proximity detector, integrated in the door, moving near the proximity detector.

12. The device according to claim 11, in which the detection is carried out by a cable of which one end is affixed magnetically to a wall of a cassette containing electronics close to the proximity detector and of which another end is connected to the access door of the trap, with the door being closed automatically after the animal passes, causing the cable to be pulled and the other end of the cable to be detached from the cassette, having an effect triggering the proximity detector.

13. The device according to claim 1, comprising at least one SIM card in the trap and one SIM card that is resident on the server.

14. The device according to claim 1, comprising at least one SIM card in the trap and a virtual call number or a SIM card in a modem connected to the server.

15. A trap for animals, in particular for vermin or pests, comprising:
a trapping device,
a detection device that detects an event,
an autonomous mobile telephony telecommunications module having an associated telephone number, and
a printed circuit board comprising a memory element and a processor, a telephone number being recorded in said memory element,
wherein trapping of an animal in the trapping device activates the detection device to make a communication comprising an unanswered telephone call, using the printed circuit board and the autonomous mobile telephony telecommunications module, to the telephone number that is recorded in said memory element, and
wherein a contents of the communication is interpreted by identifying both i) the associated telephone number of the autonomous mobile telephony telecommunications module and ii) the telephone number that is recorded in said memory element.

16. The trap according to claim 15, also comprising a stop platform (21) that has at least one entry (29) of the trap (1), allowing the vermin or pest access into a tunnel when the trap is placed against a corner (20) of a room.

17. The trap according to claim 15, in which the memory element is a SIM card.

18. The trap according to claim 15, wherein the detection device includes a proximity detector, housed inside a cassette (26), the cassette being independent of the trapping device and allowing a rapid change by a vertical slide system.

19. The trap of claim 15, wherein,
the detection device detects plural different events,
the memory element comprises plural of said telephone number recorded in said memory element, each respective said telephone number being associated with a different one of the plural different events detected by the detection device, and
the detection of each said different event activates the detection device to make a corresponding communication comprising the unanswered telephone call to the respective telephone number that is recorded in said memory element and is associated with each said different event, so that there is associated a different respective telephone number for each of said different events detected by the detection device, and the contents of the communication is interpreted by identifying both i) the associated telephone number of the autonomous mobile telephony telecommunications module of the trap, and ii) the respective call number associated with a currently detected event.

20. A method for monitoring and managing a number of traps using a system or device or at least one trap according to claim 15.

* * * * *